United States Patent [19]
Loving

[11] Patent Number: 5,337,567
[45] Date of Patent: Aug. 16, 1994

[54] LIQUID FUEL POWER PLANT AND METHOD

[75] Inventor: Ronald E. Loving, Simi Valley, Calif.

[73] Assignee: Hughes Aircraft Company, Los Angeles, Calif.

[21] Appl. No.: 972,191

[22] Filed: Nov. 5, 1992

[51] Int. Cl.$^5$ .............................................. F02C 1/00
[52] U.S. Cl. ...................................... 60/722; 60/752; 431/353
[58] Field of Search ................. 60/39.827, 39.828, 722, 60/737, 738, 752, 753; 431/11, 245, 246, 350, 353

[56] References Cited

U.S. PATENT DOCUMENTS

| | | | |
|---|---|---|---|
| 2,626,655 | 1/1953 | Trautman et al. | 60/39.141 |
| 2,641,904 | 6/1953 | Bouffart | 60/722 |
| 2,698,050 | 12/1954 | Bloomer et al. | 60/753 |
| 3,012,402 | 12/1961 | Probert et al. | 60/722 |
| 3,434,012 | 3/1969 | Rademacher | 60/39.828 |

*Primary Examiner*—Richard A. Bertsch
*Assistant Examiner*—Michael I. Kocharov
*Attorney, Agent, or Firm*—W. K. Denson-Low

[57] ABSTRACT

A liquid fuel power plant (100) including an open-ended combustion chamber (102) and a first mechanism (112) for delivering a combustible liquid fuel to the open-ended combustion chamber (102). A second mechanism (136) is included for igniting the fuel in the open-ended combustion chamber (102). A coiled tube-shaped mechanism (140) located external to the combustion chamber (102) is provided for extending the length of the combustion chamber (102) to decompose the ignited fuel and to provide an exhaust gas comprised of fundamental elements. Finally, a third mechanism (160) is provided for using the exhaust gas to perform useful work. The air input line (120) delivers compressed air, which can be preheated, in an air passageway (130) and thereafter is mixed with the combustible fuel in the open-ended combustion chamber (102). The residue of the combusted air-fuel mixture is thereafter forced by the compressed air into a coiled tube-shaped extension (140) which forths a reaction region (166) of the combustion chamber (102). The hot pressurized exhaust gas, which is very low polluting, is directed by an exhaust tube (158) to a load such as a turbine (160).

9 Claims, 4 Drawing Sheets

LIQUID FUEL POWER PLANT AND METHOD

BACKGROUND OF THE INVENTION

1. Field of the Invention

The present invention relates to power plants. More specifically, the present invention relates to methods and apparatus for a very low polluting power plant having a liquid fuel combustion chamber for the burning of hydrocarbon based fuels.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of the Related Art

Many different types of liquid fueled power plants are known in the art for providing thrust for propulsion, power generation and other applications. Examples include liquid fueled jet engines, piston engines and rocket motors of various designs. Conventional liquid fueled power plant designs tend to suffer from a number of problems not the least of which is the generation of excessive heat and noise. Also, in the case of a conventional liquid fueled rocket motor, a considerable amount of smoke can be generated which results in increased levels of atmospheric pollution.

In any event, the generation of excessive heat, noise and smoke during the launch and flight stages increases the probability that the projectile will be detected on approach. As the projectile becomes detectable, the launch point becomes detectable as well. Likewise, when driving a generator with, for example, a liquid fueled piston engine, the smoke exhaust from the engine increases the atmospheric pollution level.

Specific examples of liquid fueled power plant designs capable of providing thrust to propel a projectile include a liquid fueled turbine jet engine and a liquid fueled ramrocket motor. Turbine jet engines employing liquid fuel are known and are capable of providing thrust to propel a projectile and to provide rotational power to ground based power generator plants. In general, a turbine jet engine has a long cylindrical body and includes one or more liquid fuel burning chambers. The burning chamber is located at the center of the long cylindrical body and normally burns at temperatures in excess of three-thousand degrees Fahrenheit. The turbine jet engine includes multiple compression stages which produces a very high pressure in the burning chamber. When the liquid fuel is injected into the burning chamber, the fuel is combusted to provide hot, high pressure gases and enormous output horsepower.

The outer walls of the burning chamber are at a lower temperature than that of the flame at the center of the burning chamber. Because of the temperature differential between the flame and the outer wall and the operating temperature of the burning chamber, the liquid fuel is not totally combusted. The liquid fuel is generally a hydrocarbon based fuel. When particles of a hydrocarbon based fuel are not totally burned, hydrocarbon based pollutants are produced. Further, since all of the liquid fuel is not totally combusted, the turbine jet engine is not fuel efficient. Additionally, the turbine jet engine is very noisy and produces excessive heat. Each of these characteristics of turbine jet engines increases the detectability of a projectile and the pollution level of the atmosphere.

The second example of a known liquid fueled power plant design capable of providing thrust to propel a projectile is a ramrocket motor. The ramrocket motor is a hybrid rocket motor generally having a short motor casing. The length of the motor casing is approximately three times the diameter of the rocket motor combustion chamber. The ramrocket motor burns liquid fuel which is injected into the combustion chamber along with compressed ambient air. The output of the combustion chamber is a hot pressurized gas which is directed to an impulse turbine blade that rotates a propeller or ducted fan. Ramrocket motors are normally utilized with air breathing missiles or any application that utilizes hot pressurized gas.

The combustion chamber of the ramrocket motor includes a device that provides a flame at the center of the rocket motor. Thus, the center of a ramrocket motor also operates at a temperature in excess of three-thousand degrees Fahrenheit. A high volume of air is forced through the rocket motor causing the temperature of the outer wall of the combustion chamber to be lower than the temperature at the center of the combustion chamber. The temperature differential between the center and the outer wall of the rocket motor results in incomplete combustion of some liquid fuel drops. This condition produces hydrocarbon and carbon pollution which is exhausted to the atmosphere. Therefore, liquid fueled rocket motors must be preheated to a specific temperature range to ensure total combustion of the fuel. Otherwise, a fuel efficiency problem results.

Further, the desired combustion temperature range of operation within the ramrocket motor is difficult to control. If the desired combustion temperature range is not maintained, the flame at the center of the combustion chamber is extinguished because of the length-to-diameter ratio of the motor casing. Further, ramrocket motors must be operated very hot and fuel rich to avoid extinguishing of the combustion chamber flame. This situation results in fuel waste. Additionally, if the liquid fuel and compressed air are not properly mixed, residue smoke in the form of carbon particles appears in the exhaust gases. The smoke residue permits the projectile to be optically tracked. Finally, the ramrocket motor is very noisy which permits the projectile to be tracked by an audible sensor. Each of these characteristics of ramrocket motors increases the detectability of the projectile and the pollution level of the atmosphere.

A final example of a liquid fuel power plant design of the prior art is an incinerator employed for destroying hazardous waste. The incinerator includes a cylindrical combustion chamber joined by a flat circular plate to a smaller inlet pipe. Fuel nozzles protrude through the flat plate into the combustion chamber. The air and fuel are not premixed but rather are injected into the combustion chamber at the point of flame stabilization. Total combustion of the fuel occurs and low nitrous oxide ($NO_x$) levels are produced. Recirculation of the gas and air mixture is employed to ensure total combustion. The heat generated by the combustion is released to the atmosphere through a long hot exhaust tube that completes the decomposition of the hydrocarbon and carbon molecules.

Thus, there is a need in the art for improvements in the design of liquid fueled power plants to reduce the detectability of and the exhausted pollutants from the power plants.

SUMMARY OF THE INVENTION

The need in the art is addressed by the liquid fuel power plant and method of the present invention. The invention includes an open-ended combustion chamber and a first mechanism for delivering a combustible liquid fuel to the open-ended combustion chamber. A second mechanism is included for igniting the fuel in the open-ended combustion chamber. A coiled tube-shaped mechanism located external to the combustion chamber is provided for extending the length of the combustion chamber to decompose the ignited fuel and to provide an exhaust gas comprised of fundamental elements. Finally, a third mechanism is provided for using the exhaust gas to perform useful work.

In a preferred embodiment, the liquid fuel power plant includes separate air and fuel input lines. The air input line delivers compressed air, which can be preheated, in an air passageway and thereafter is mixed with the combustible fuel in the open-ended combustion chamber. An igniter causes combustion of a compressed air-fuel mixture in an ignition region of the combustion chamber. The residue of the combusted air-fuel mixture is thereafter forced by the compressed air into a coiled tube-shaped extension which forms a reaction region of the combustion chamber. The reaction region becomes sufficiently hot to ensure complete decomposition of the combustible fuel. The hot pressurized exhaust gas, which is very low polluting, is directed by an exhaust tube to a load such as a turbine.

DESCRIPTION OF THE INVENTION

Figure 1:
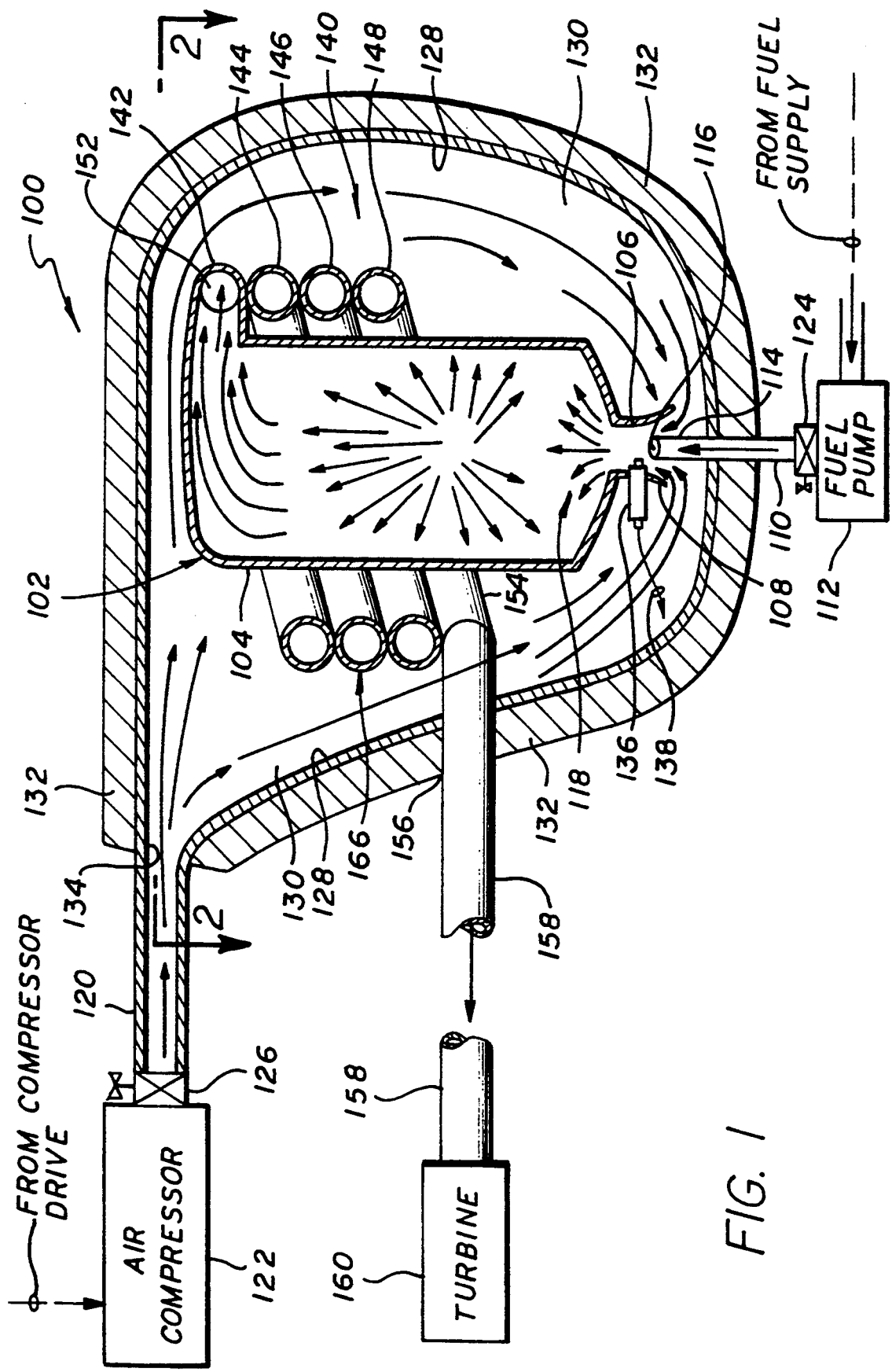
FIG. 1 is a simplified elevational view, partly in section and block, of an illustrative embodiment of the liquid fuel power plant of the present invention showing a combustion chamber including an extension having a coiled tube-shaped construction.

The invention is a liquid fuel power plant 100 as shown in FIG. 1. The power plant 100 includes an open-ended combustion chamber 102 which has no moving parts. The combustion chamber 102 preferably employed in the present invention is bounded by an outer wall 104 as shown in FIG. 1. A cylindrical input port 106 having a curved outer lip 108 is formed in the outer wall 104 and accommodates a fuel feed line 110 carrying a combustible hydrocarbon based fuel. The fuel is fed from a fuel source (not shown) through the fuel feed line 110 by conventional methods such as, for example, by a fuel pump 112 as shown in FIG. 1. The fuel feed line 110 terminates in a fine spray nozzle 114 formed by punching a hole 116 in the end of the fuel feed line 110 for atomizing the fuel delivered to an ignition region 118. The small fuel droplets caused by atomizing the combustible fuel in the spray nozzle 114 results in higher efficiency ignition of cheaper fuels that are otherwise difficult to burn.

The cylindrical input port 106 also serves as an inlet port for preheated compressed air or liquid oxygen. The compressed air or liquid oxygen is mixed in the correct proportions with the particular combustible fuel in the ignition region 118 of the combustion chamber 102. The compressed air or liquid oxygen each serve as an oxidizer to sustain the burning of the combustible fuel in the ignition region 118. In the preferred embodiment of the liquid fuel power plant 100 shown in FIG. 1, compressed air is provided to an air inlet line 120 by an air compressor 122. The air compressor 122 is one of a variety known in the art and is operated by a drive mechanism such as a rotating drive shift (not shown). Both the fuel feed line 110 and the compressed air input line 120 can include a gate control valve 124 and 126, respectively, to prevent the air-fuel mixture from backfeeding into the fuel pump 112 and the air compressor 122 via the lines 110 and 120, respectively.

Completely surrounding the combustion chamber 102 and a combustion chamber extension 140 described in detail hereinbelow is an outer cylindrical wall 128 best shown in FIG. 2. Located between the outer wall 104 of the combustion chamber 102 and the outer cylindrical wall 128 is an air passageway 130. The air passageway 130 serves to direct the input air from the compressor 122 to the cylindrical input port 106 of the combustion chamber 102. Thus, in addition to housing the combustion chamber 102, the outer cylindrical wall 128 forms the air passageway 130. The input air passing through the air passageway 130 is preheated by the heat of combustion escaping through the outer wall 104 of the combustion chamber 102 and from the combustion chamber extension 140. Preheating the input air traveling within the air passageway 130 in this manner increases the efficiency of combustion within the chamber 102. The curved outer lip 108 of the cylindrical input port 106 serves to assist in directing the preheated input air from the air passageway 130 to the ignition region 118.

Figure 2:
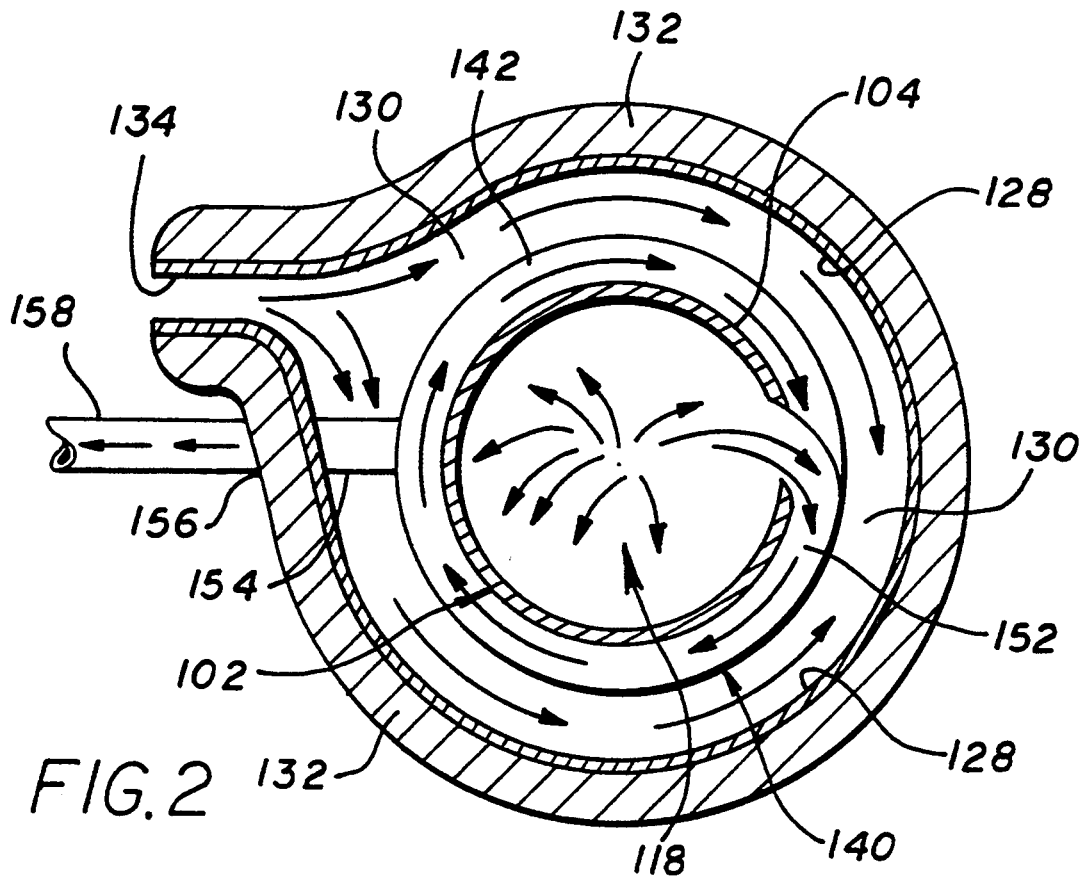
FIG. 2 is a cross-sectional view taken along the line 2—2 of FIG. 1 showing the construction of the coiled tube-shaped extension surrounding the top of the combustion chamber and an outer cylindrical wall and a heat shield of the power plant.

Surrounding the outer cylindrical wall 128 is an insulated heat shield 132 as shown in FIGS. 1 and 2. The heat shield 132 serves to prevent the loss of heat generated by the combustion within the chamber 102. By containing heat normally dissipated to the environment, the efficiency of combustion in the chamber 102 is improved. The heat shield 132 is comprised of any suitable material for preventing the flow of heat past the outer cylindrical wall 128 of the combustion chamber 102. An example of a suitable material for the heat shield 132 is porous ceramic of the type having a bubble construction that insulates heat. Note that the shape of the heat shield 132 and the outer cylindrical wall 128 funnels down to form a neck portion 134. The neck portion 134 coincides with and is connected to the air inlet line 120 in a manner known in the art as shown in FIG. 1.

Mounted within the cylindrical input port 106 of the outer wall 104 of the combustion chamber 102 is an igniter 136. The igniter 136 extends into the combustion chamber 102 and functions to ignite the combustible air-fuel mixture within the ignition region 118. The igniter 136 can be one of several devices depending upon the hydrocarbon based fuel utilized in the power plant 100. For example, if a lightweight fuel such as natural gas, butane, propane or gasoline is employed, the igniter 136 can be a spark plug. For lightweight fuels, the spark plug is continuously energized. If a heavier fuel such as diesel is utilized, a spark plug continues to be the preferred igniter device. However, a glow plug can also be employed as the igniter 136. A glow plug incorporates a platinum wire that is constantly energized and glows white hot to ensure combustion of the air-fuel mixture. The igniter 136 is connected to an electrical circuit identified by the electrical lead 138 in FIG. 1 to provide a spark for burning the air-fuel mixture. A by-product of the combustion within the ignition region 118 of chamber 102 is hot pressurized gases which include pollutants. The presence of the gate control valves 124 and 126 prevent the hot pressurized gases from entering the fuel pump 112 and the air compressor 122, respectively.

The combustion chamber 102 further includes the extension 140 as shown in FIGS. 1 and 2. In the present invention, the extension 140 is located entirely external to the outer wall 104 of the combustion chamber 102. The combustion chamber extension 140 comprises a tubular-shaped construction which is coiled in a manner reminiscent of a mechanical spring. Each of the coils of the extension 140 is tube-shaped, hollow, continuous and in juxtaposition to each of the adjacent coils. Further, each of the tube-shaped coils are mounted at a slight angle as shown in FIG. 1 to facilitate receiving and exhausting the hot pressurized gases generated by the combustion of the air-fuel mixture. The combustion chamber extension 140 is shown in FIG. 1 as having a plurality of four tubular coils 142, 144, 146, and 148 for illustration purposes only. The number of tubular coils included in the design of a particular extension 140 is dependent upon the operating temperature range and the grade of hydrocarbon based fuel utilized.

Figure 3:
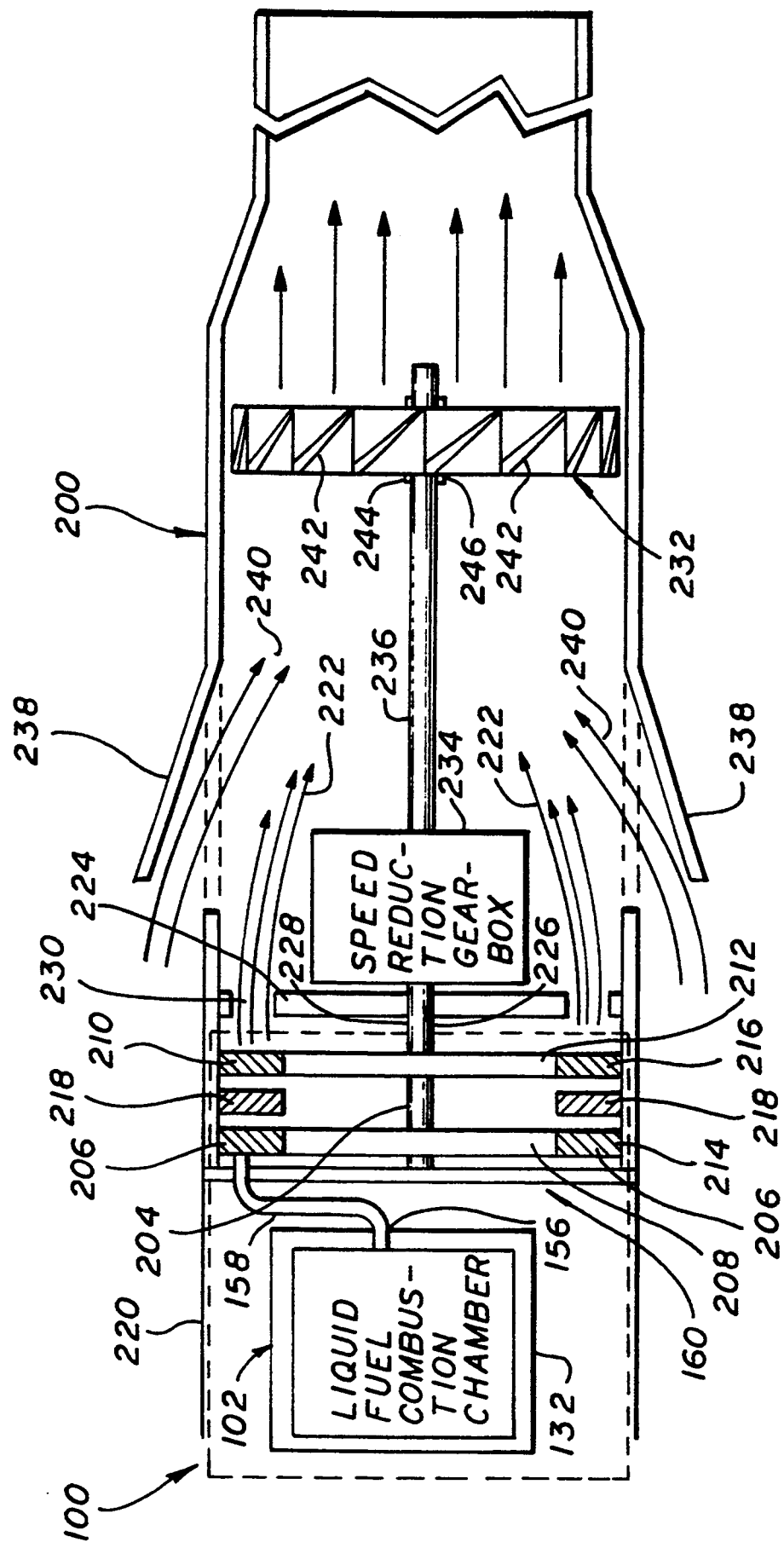
FIG. 3 is a simplified view, partly in section and partly in block, of an application of the liquid fuel power plant of the present invention showing the combustion chamber of FIG. 1 connected to a turbine within a typical projectile tube.

The coiled tube-shaped extension 140 includes an input end 152 and an exhaust end 154. The input end 152 receives the hot pressurized gases forcibly repositioned from the ignition region 118 by the pressurized input air. The input end 152 leads directly into the tubular coil 142. The exhaust end 154 of the extension 140 passes through the outer cylindrical wall 128 and the insulated heat shield 132 via a penetration 156. Beyond the outer cylindrical wall 128 and the heat shield 132, the exhaust end 154 of the combustion chamber extension 140 becomes an exhaust tube 158. The exhaust tube 158 is routed to a load via a turbine 160 as shown in FIGS. 1 and 3.

The hot pressurized gases are forced to travel from the ignition region 118 further into the combustion chamber 102 by the expansion of the compressed air in the air-fuel mixture. Then, a portion of the hot pressurized gases pass into the combustion chamber extension 140. That portion of the hot pressurized gases not passing into the extension 140 is temporarily delayed from exiting the ignition region 118 of the combustion chamber 102. In particular, the delayed gases are forced to recirculate back to the ignition region 118. Further exposure of the hot pressurized gases to the ignition region 118 ensures complete combustion of the air-fuel mixture. The distance between the spray nozzle 114 at the end of the fuel feed line 110 and the input end 152 of the extension 140 should be a direct path as is shown in FIG. 1 to ensure proper recirculation and complete combustion of the gases.

The plurality of tubular coils 142, 144, 146 and 148 of the combustion chamber extension 140 are fabricated to provide a continuous pathway through the extension 140. The continuous pathway is provided between the input end 152 and the exhaust end 154 to ensure that the combustion chamber 102 is open-ended for the passage of the hot pressurized gases therethrough. The hot pressurized gases that pass into the tube-shaped extension 140 saturate the walls of each of the tubular coils 142, 144, 146 and 148. Thus, the temperature of the combustion chamber extension 140 is raised to approximately that of the combustion chamber 102. The coiled tube-shaped extension 140 effectively lengthens the combustion chamber 102 from (6'-8') to (3" to 5"). The length of the coiled tube-shaped extension 140 is dependent upon the dimensions of the combustion chamber 102 and on the type of fuel utilized. By lengthening the chamber 102 and by reusing the heat generated by the combustion, total burning of the air-fuel mixture and any hydrocarbon pollutants created in the chamber 102 is ensured. Lengthening the combustion chamber 102 via the extension 140 also prevents ignition termination (e.g., flame out) since the combustion can take place anywhere along the length of the extension 140.

The coiled tube-shaped extension 140 forms a "reaction region" 166 which is connected to the exhaust tube 158 at the exhaust end 154 in a manner known in the art as shown in FIG. 1. The reaction region 166 is located within the plurality of tube-shaped coils 142, 144, 146 and 148 and extends from the input end 152 to the exhaust tube 158. The hydrocarbon pollutants created in the ignition region 118 are either burned and disintegrated or are forced to decompose to the base elements in the reaction region 166 due to the presence of the heat and oxygen. Thus, the coiled tube-shaped extension 140 functioning as a reaction region 166 expels very low pollution gases to the exhaust tube 158 as shown in FIG. 1. The very low pollution gases are thereafter directed to a mechanism such as the turbine 160 for driving a load as described hereinbelow. Further, the reaction region 166 of the extension 140 enables the use of a very lean air-fuel mixture which improves the efficiency of operation.

The combustion chamber 102 and the associated coiled tube-shaped extension 140 is formed of high temperature ceramic or metal and can withstand temperatures in excess of 3000 degrees Fahrenheit. The extension 140 and the combustion chamber 102 can be of unitary construction as shown in FIG. 1. Additionally, the extension 140 can be further supported on the exterior of the combustion chamber 102, for example, by a bracket device (not shown). In either case, the combustion chamber 102, the extension 140 and any connecting structure should be comprised completely of ceramic or metal. An example of a suitable metal for use in forming the outer wall 104 of the combustion chamber 102 and the extension 140 is a nickel-steel based alloy. Likewise, the exhaust tube 158 and structure associated therewith are formed from either ceramic or metal that is consistent with the material comprising the combustion chamber 102. In general, the nickel alloy construction is employed for lower temperature operations while the ceramic construction is utilized for higher temperature operations.

The hot pressurized gases exiting the combustion chamber extension 140 cause the temperature of the exhaust end 154 of the extension 140 and the exhaust tube 158 to be very high. The compressed air passing through the air passageway 130 contacts the exhaust tube 158 in addition to the extension 140 resulting in heat transfer from the exhaust tube 158 to the incoming compressed air. Thus, the exhaust tube 158 also serves to preheat the incoming compressed air to increase the efficiency of the combustion chamber 102. Thereafter, the exhaust tube 158 extending from the exhaust end 154 passes through the outer cylindrical wall 128 and the heat shield 132 via the penetration 156. The penetration 156 is then sealed in a manner known in the art. Additionally, the air inlet line 120 and the outer cylindrical wall 128 are each comprised from a material consistent with the material used to form the combustion chamber 102. A nickel-steel based alloy can be used for applications to 2000 degrees Fahrenheit while ceramic can be utilized for applications at higher temperatures.

A portion of FIG. 1 shows the coiled tube-shaped extension 140 located external to the combustion chamber 102 in crosssection. Each of the coils 142, 144, 146 and 148 is shown in crosssection exposing the tube-shaped hollow interior of the extension 140. The relationship between the outer wall 104, the combustion chamber extension 140, the air passageway 130, the outer cylindrical wall 128 and the insulated heat shield 132 is shown in FIG. 2. The view of FIG. 2 shows the power plant 100 in full cross-section to permit an appreciation of the relationship between the associated structure. The coil 142 is shown at the top of the extension 140 with the exhaust tube 158 passing through the penetration 156 formed in the outer cylindrical wall 128 and the insulated heat shield 132. Further, the air passageway 130 is shown positioned between the outer wall 104 and the outer cylindrical wall 128.

During operation, the liquid fuel power plant 100 functions in the following manner. The combustible fuel is forced through the fuel feed line 110 by the fuel pump 112 to the spray nozzle 114. Simultaneously, the air compressor 122 delivers preheated compressed air to the cylindrical input port 106 via the air passageway 130. The compressed air and atomized combustible fuel are mixed in the combustion chamber 102 as shown in FIG. 1. The air-fuel mixture is ignited by the igniter 136 resulting in combustion of the mixture in the ignition region 118 of the combustion chamber 102. The small fuel droplets provided by atomizing the combustible fuel in the spray nozzle 114 results in higher efficiency ignition. The air-fuel mixture burns and generates hot expanding gases. The pressure of the hot expanding gases is derived from the pressure of the compressed air and the expansion of the air when the fuel is combusted.

As the present combustion of the air-fuel mixture takes place in the combustion chamber 102, the gases from the immediate previous combustion will be forced toward the reaction region 166 of the coiled tube-shaped extension 140 by the pressure of the expanding gases. A portion of the hot pressurized gases from the ignition region 118 passes into the input end 152 of the extension 140. The portion of the hot pressurized gases not passing into the input end 152 of the extension 140 is temporarily delayed from exiting the ignition region 118. The delayed gases are redirected to the ignition region 118 to ensure complete combustion of the air-fuel mixture. The portion of the hot expanding gases passing into the input end 152 travel into the coiled tube-shaped extension 140. The tubular walls of the coils 142, 144, 146 and 148 of the combustion chamber extension 140 retain sufficient heat from the hot gases to ensure complete combustion or decomposition of the fuel and any residual pollutants before reaching the exhaust tube 158. The exhaust gases are, therefore, very nearly pollution free and can be controlled to produce useful work such as providing shaft power output from the power plant 100.

The combustion chamber 102 of the liquid fuel power plant 100 is operated within the temperature range of from 400 degrees Fahrenheit to 2000 degrees Fahrenheit. The exhaust gases are therefore within the low-to-medium temperature range while the pressure of the exhaust gases is within the low-to-medium pressure range (e.g., up to 100 PSI). This temperature range has been selected to ensure complete combustion of the fuel while avoiding production of nitrous oxides ($NO_x$). Operating temperatures above 2000 degrees Fahrenheit result in the production of higher nitrous oxide ($NO_x$) levels. By operating the combustion chamber 102 in the selected temperature range, the fuel will be completely combusted or decomposed to basic pollution free elements such as carbon, hydrogen and oxygen. Therefore, the combustion chamber 102 functions as a catalytic converter in the selected temperature range.

Any inexpensive fuel can be used in the combustion chamber 102 including diesel, kerosene, JP fuels and natural gas. By atomizing the combustible fuel in the spray nozzle 114, cheaper fuels that are otherwise difficult to burn can be utilized. By varying the proportions of compressed air and fuel, the proper mixture can be determined to ensure total combustion of the fuel. Total combustion means that all the energy in the fuel has been utilized. Each individual fuel will require an adjustment of the proportion of the compressed air utilized. After the correct mixture of air and fuel is achieved, less fuel will be necessary to generate the energy to accomplish a task than was previously required for other known power plants using the same fuel.

The liquid fuel power plant 100 of the present invention is a small, lightweight, multi-fuel very low polluting combustion engine in which the low-to-medium temperature and pressure exhaust gases are employed to operate a load. The combustion chamber 102 has no moving parts and is a stand-alone device that utilizes inexpensive hydrocarbon based fuels. The power plant 100 is very versatile in that it can be used for developing hot pressurized gases for use in, for example, an electrical generator, a turbine water pump, a recreational vehicle, a garden tractor, a battery charger, a small aircraft or a projectile. More specifically, when utilized with a turbine wheel to rotate a drive shaft, the power plant 100 provides inexpensive pollution free power to propel unmanned air vehicles or to operate an electrical generator to provide AC or DC voltage and current.

One of the many applications of the liquid fuel power plant 100 is shown in FIG. 3. The power plant 100 is shown located within a projectile 200 and is utilized to rotate the turbine 160 at high RPM. The exhaust tube 158 is connected between the end of the combustion chamber extension 140 and the turbine 160 as shown in FIG. 1. The pressurized gases generated by the combustion chamber 102 are directed through the exhaust tube 158 to spin the turbine 160 about a turbine axis 204 as shown in FIG. 3 and described hereinbelow. Note that it is also possible to connect the exhaust tube 158 of the combustion chamber 102 to a manifold (not shown) and then to connect a plurality of exhaust tubes from the manifold to the turbine 160. In either case, the pressurized gases are directed to the turbine 160 which is of a conventional design comprising one or more turbine blade wheels.

The turbine 160 of the power plant 100 shown in FIG. 3 depicts a two stage turbine for illustration purposes only. It is to be understood that a single stage turbine or a multiple stage turbine (e.g., greater than one stage) can also be utilized. In general, multiple stage turbines impart greater efficiency and horsepower. It is further noted that the pressure range of the hot gases produced by the power plant 100 is also dependent upon the number of turbine stages and the number and shape of the blades per turbine stage. The turbine 160 includes a first turbine stage 206 having a first rotating wheel 208 and a second turbine stage 210 having a second rotating wheel 212. The end of the first rotating wheel 208 includes a first set of turbine blades 214 and the end of the second rotating wheel 212 includes a second set of turbine blades 216. Positioned between the first and second sets of turbine blades 214 and 216 is a stationary set of blades 218 commonly referred to as stators. Stators are utilized to condition or redirect the gases for the next turbine stage.

The pressurized gases generated by the combustion chamber 102 are directed to the first turbine stage 206 by the exhaust tube 158. Since the first and second sets of turbine blades 214 and 216 are respectively connected to the first and second rotating wheels 208 and 212, then each set of turbine blades 214 and 216 also rotate. The pressurized gases initially strike the first set of turbine blades 214 which causes the first rotating wheel 208 of the first turbine stage 206 to rotate about the axis 204. The gases are then redirected to the stationary set of blades 218. The stationary set of blades 218 is mounted to an outer tube or metal housing 220 of the projectile 200 as shown in FIG. 3. In the example implementation, the shape of the stationary set of turbine blades 218 is opposed to that of the first and second sets of turbine blades 214 and 216. Thus, a function of the stationary set of blades 218 is to redirect and condition the gases from the output of the first rotating wheel 208 to the second turbine stage 210. The stationary set of blades 218 also orients the gases to the correct angle to achieve the maximum energy transfer to the second turbine stage 210.

The gases are then directed from the stationary set of blades 218 to the second set of turbine blades 216. When the gases strike the second set of turbine blades 216, the second rotating wheel 212 is caused to rotate about the turbine axis 204. In general, the first turbine stage 206 is approximately 75% efficient while the second turbine stage 210 is approximately 10% efficient. A third turbine stage, if employed, would be approximately 5% efficient with the remainder of the energy in the pressurized gases being lost as heat energy. The density, temperature and pressure of the gases emitted from the exhaust tube 158 will determine the rotational speed in RPM of the turbine 160. As an example, a turbine wheel having a diameter of 5" and a drive shaft length of 4" and weighing approximately five pounds can be rated to provide a forty horsepower output.

The exhaust gases (indicated by numeral 222) expelled from the second turbine stage 210 will be at or near atmospheric pressure. This indicates that the first and second turbine stages 206 and 210 have absorbed almost all of the energy contained in the gases. Therefore, noise is not likely to be generated by the gases. This feature further minimizes the generation of noise in the entire power plant 100 making it more difficult to detect with audible detection devices. Thus, the power plant 100 is more attractive for use in stealth type devices.

The exhaust gases 222 are then directed from an exhaust region of the turbine 160 to a diffuser plate 224 as shown in FIG. 3. In the example implementation of the present invention, the diffuser plate 224 is a metallic plate mounted to the inside surface of the outer tube 220 of the projectile 200. The diffuser plate 224 includes a penetration 226 for the passage of a drive shaft 228. One of the functions of the diffuser plate 224 is to direct the exhaust gases out of the exhaust region of the turbine 160 through a passageway 230 to a load such as a ducted fan type propeller 232 positioned within the projectile 200. Another function of the diffuser plate 224 is to absorb additional energy from the gases. This action causes the gases to slow down further minimizing the noise generated by the power plant 100.

The rotating drive shaft 228 can be connected to a speed reduction gearbox 234 to achieve the proper rotational speed for the load attached to the power plant 100. The load is attached to the power plant 100 via an output drive shaft 236 extending from the speed reduction gearbox 234 as shown in FIG. 3. It is noted that the speed reduction gearbox 234 can be of a conventional design and is an optional feature that may not be necessary in a particular load application. A plurality of loads can be driven by the power plant 100. When the power plant 100 is utilized to propel the projectile 200, an appropriate load is the ducted fan type propeller 232 shown in FIG. 3.

The metal housing or outer tube 220 of the projectile 200 includes a vent flap 238 as shown in FIG. 3. The function of the vent flap 238 is to admit ambient air (indicated by the numeral 240) into the projectile 200. The ambient air 240 is drawn into the projectile 200 by the ducted fan type propeller 232. The ambient air 240 is then mixed with the exhaust gases 222 from the turbine 160 to dissipate the heat contained therein. The dissipation of the heat in the exhaust gases 222 makes the power plant 100 and the projectile 200 less vulnerable to detection by infrared type sensor devices. The ambient air and exhaust gas mixture is then fed to the ducted fan type propeller 232 to provide the thrust to propel the projectile 200.

The ducted fan type propeller 232 is internally located within the metal housing or outer tube 220 as shown in FIG. 3. The ducted fan type propeller 232 serves to provide the thrust to the projectile 200 by compressing (e.g., speeding up) the air as the air passes through the outer tube 220. Since the ducted fan type propeller 232 is located inside of the outer tube 220, it is usually of a small size. A plurality of fan blades 242 of the ducted fan type propeller 232 is shown in FIG. 3. The fan blades 242 are shown mounted to a center cog 244 having a center penetration 246 for accommodating the output drive shaft 236. The fan blades 242 serve to compress the air mixture. The number of fan blades 242 and the RPM at which they rotate provide a certain level of thrust to the projectile 200. The RPM of the fan blades 242 is directly related to the output of the turbine 160 and the speed reduction gearbox 234, if used.

Other examples of the utility of the present invention exist which include the instant liquid fuel power plant 100 as shown in FIG. 1 and in block form in FIG. 3. In the other examples, the power plant 100 interfaces with the turbine 160 and the drive shaft 228 as described above. However, the ducted fan type propeller 232 is replaced by another load. For example, the load can be a DC or an AC electrical generating device (not shown) used to provide power to other electrical loads. Thus, a variety of loads can be substituted for the ducted fan type propeller 232.

Figure 5:
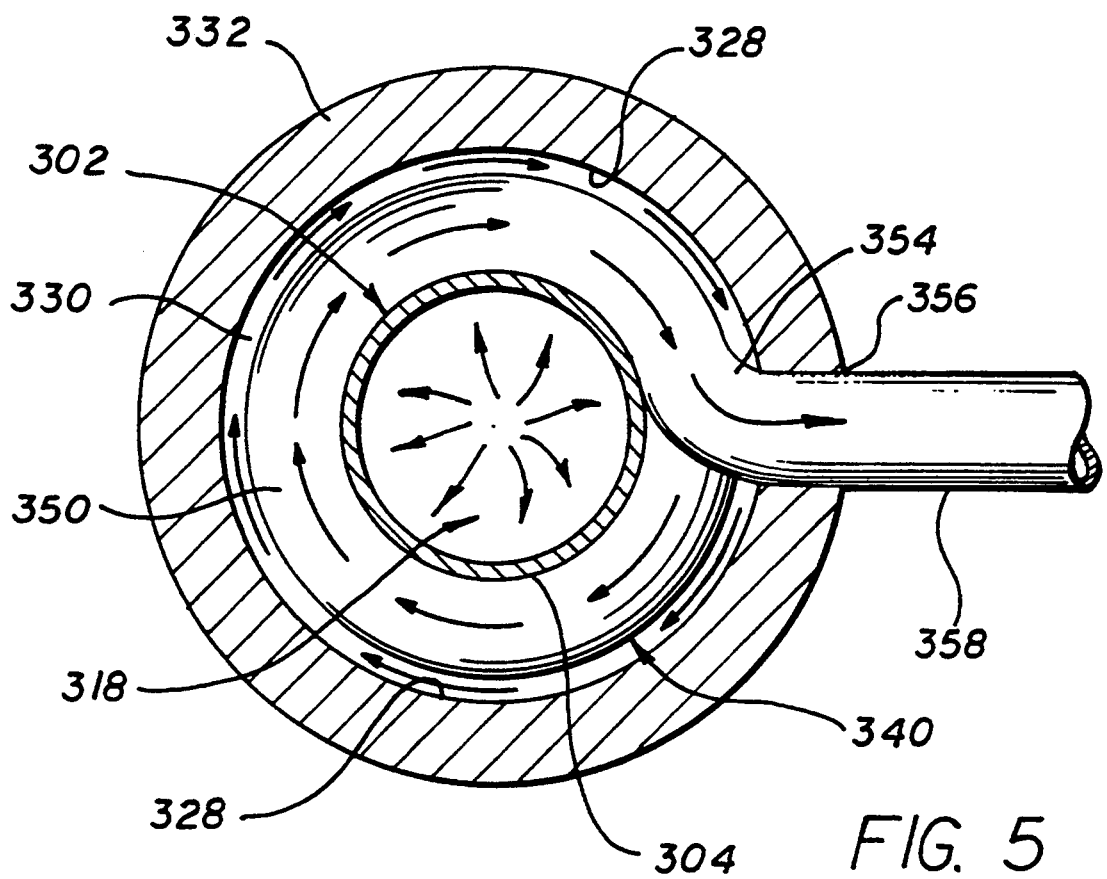
FIG. 5 is a cross-sectional view taken along the line 5—5 of FIG. 4 showing the construction of the coiled tube-shaped extension surrounding the top of the combustion chamber and an outer cylindrical wall and a heat shield of the power plant.
Figure 4:
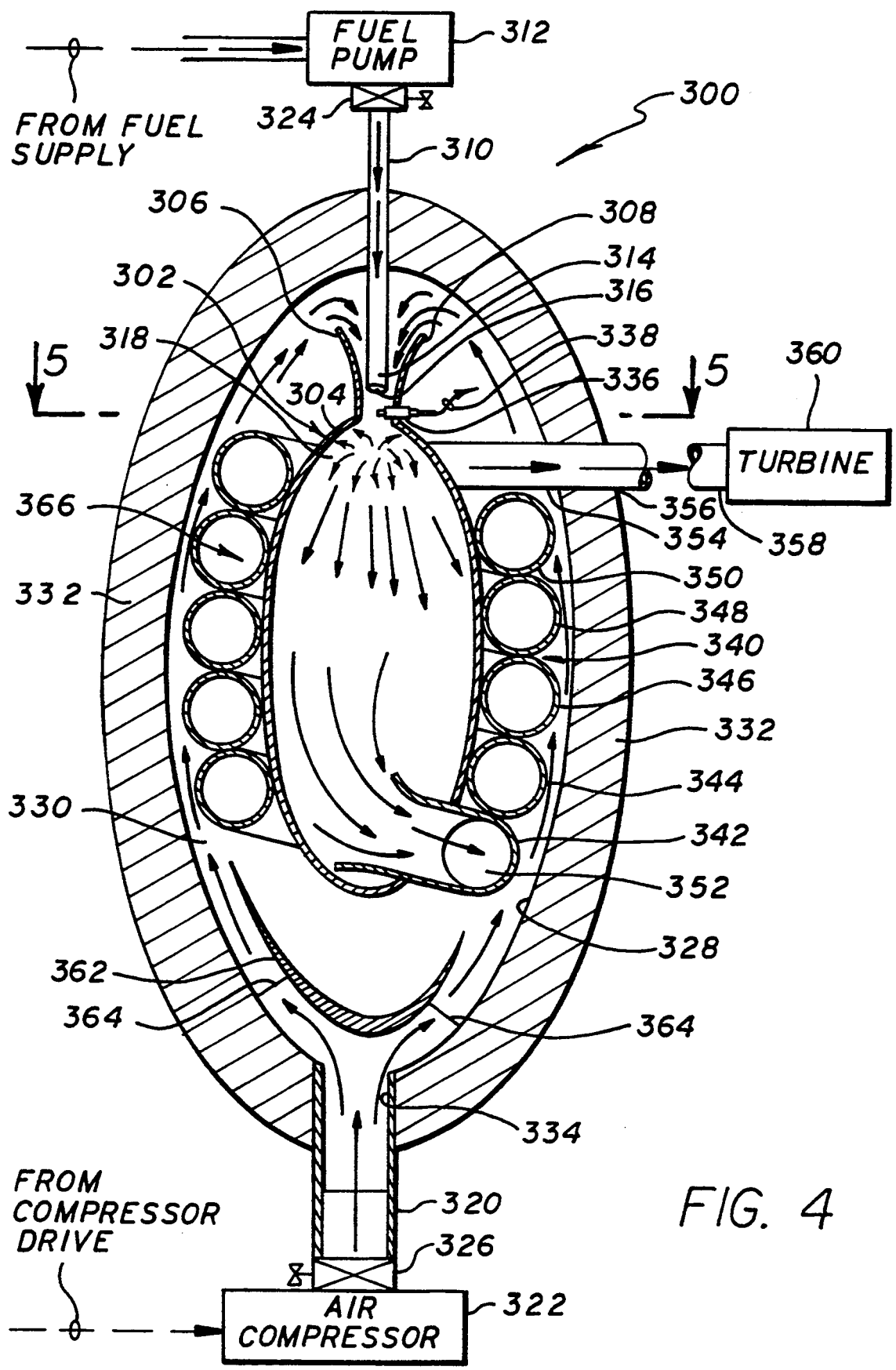
FIG. 4 is a simplified elevational view, partly in section and block, of an alternative embodiment of the liquid fuel power plant of the present invention showing a combustion chamber including an extension having a coiled tube-shaped construction.

An alternative embodiment of the present invention is disclosed in FIGS. 4 and 5. In this instance, the alternative embodiment of the liquid fuel power plant includes a combustion chamber and extension of the type shown in FIGS. 1–3. Those components of the liquid fuel power plant of FIGS. 4 and 5 which find substantial correspondence in structure and function to those parts of FIGS. 1–3 are designated with corresponding numerals of the three-hundred series.

The liquid fuel power plant 300 includes an oval-shaped combustion chamber 302 which is bounded by an outer wall 304 as shown in FIG. 4. A cylindrical input port 306 having a curved outer lip 308 is formed in the outer wall 304 for passing compressed air therethrough. A fuel feed line 310 is shown carrying a combustible hydrocarbon based fuel into the combustion chamber 302. The fuel is fed from a fuel source (not shown) through the fuel feed line 310 by conventional methods such as, for example, by a fuel pump 312 shown in FIG. 4. The fuel feed line 310 terminates in a fine spray nozzle 314 which is formed by punching a hole 316 in the end of the fuel feed line 310. The hole 316 formed in the end of the spray nozzle 314 facilitates the atomizing of the fuel delivered to an ignition region 318. The small fuel droplets caused by atomizing the combustible fuel in the spray nozzle 314 results in higher efficiency ignition of cheaper fuels that are otherwise difficult to burn.

Completely surrounding the oval-shaped combustion chamber 302 is an outer cylindrical wall 328 best shown in FIG. 5. Located between the outer wall 304 of the combustion chamber 302 and the outer cylindrical wall 328 is an air passageway 330 for the passage of pressurized air delivered to the input port 306 by an air compressor 322. Surrounding the outer cylindrical wall 328 is an insulated heat shield 332 as shown in FIGS. 4 and 5. The function and structure of the outer cylindrical wall 328, the air passageway 330 and the insulated heat shield 332 is duplicate to that as describe with respect to the power plant 100 of the preferred embodiment.

Mounted within the air passageway 330 just inside an air inlet line 320 is a crescent-shaped air deflector 362 as shown in FIG. 4. The air deflector 362 is positioned to route the pressurized air provided by the air compressor 322 through the air passageway 330 to the input port 306. The air deflector 362 is formed of a material that is consistent with the material comprising the combustion chamber 302 as noted in the description of the power plant 100. The air deflector 362 can be mounted to the inside of the outer cylindrical wall 328 by a bracket 364 as shown in FIG. 4. The bracket 364 includes one or more penetrations (not shown) so as not to impede the flow of the pressurized air from the air compressor 322. Also, the bracket 364 can be formed via unitary construction with the outer cylindrical wall 328. It is noted that the air deflector 362 is optional and not necessary for the operation of the power plant 300.

Mounted within the cylindrical input port 306 of the outer wall 304 of the combustion chamber 302 is an igniter 336 as shown in FIG. 4. The igniter 336 extends into the combustion chamber 302 and functions to ignite a combustible air-fuel mixture within the ignition region 318. The igniter 336 can be one of several devices depending upon the hydrocarbon based fuel utilized in the power plant 300. The selection of the igniter 336 is based upon the same criteria as those presented with respect to the power plant 100. The igniter 336 is connected to an electrical circuit identified by the electrical lead 338 to provide a spark for burning the air-fuel mixture. A by-product of the combustion within the ignition region 318 of chamber 302 is hot pressurized gases which include pollutants.

The combustion chamber 302 further includes an extension 340 as shown in FIGS. 4 and 5. The extension 340 is located entirely external to the outer wall 304 of the combustion chamber 302. The combustion chamber extension 340 comprises a tubular-shaped construction similar to that described with respect to the power plant 100. Each of a plurality of coils 342, 344, 346, 348 and 350 of the extension 340 is tube-shaped, hollow, continuous and in juxtaposition to each of the adjacent coils. Further, each of the tube-shaped coils are mounted at a slight angle as shown in FIG. 4 to facilitate receiving and exhausting the hot pressurized gases generated by the combustion of the air-fuel mixture. It is noted that the fuel feed line 310, the input port 306 and an exhaust tube 358 of the power plant 300 are positioned in reverse order compared to the corresponding elements disclosed in the power plant 100.

The coiled tube-shaped extension 340 includes an input end 352 and an exhaust end 354. The input end 352 receives the hot pressurized gases forcibly repositioned from the ignition region 318 by the pressurized input air. The input end 352, which is located at the bottom of the combustion chamber 302, leads directly into the tubular coil 342. The exhaust end 354 of the extension 340 passes through the outer cylindrical wall 328 and the insulated heat shield 332 via a penetration 356. Beyond the outer cylindrical wall 328 and the heat shield 332, the exhaust end 354 of the combustion chamber extension 340 becomes the exhaust tube 358. The exhaust tube 358 is routed to a load via a turbine 360 as shown in FIG. 4.

The relationship between the outer wall 304 of the combustion chamber 302, the combustion chamber extension 340, the air passageway 330, the outer cylindrical wall 328 and the insulated heat shield 332 is shown in FIG. 5. The view disclosed in FIG. 5 shows the power plant 300 in full cross-section to permit an appreciation of the relationship between the associated structure. The coil 350 is shown at the top of the extension 340 with the exhaust tube 358 extending through the penetration 356 formed in the outer cylindrical wall 328 and the insulated heat shield 332. Further, the air passageway 330 is shown positioned between the outer wall 304 and the outer cylindrical wall 328.

Each of the remaining elements of the liquid fuel power plant 300 shown in FIGS. 4 and 5, the construction and the operation thereof is duplicate to that previously disclosed with regard to the power plant 100. The liquid fuel power plant 300 is a compact design suitable for use in each of the applications mentioned in the description of the power plant 100.

Thus, the present invention has been described herein with reference to a particular embodiment for a particular application. Those having ordinary skill in the art and access to the present teachings will recognize additional modifications, applications and embodiments within the scope thereof. Although the detailed description is directed to a turbine driven air vehicle application, the liquid fuel power plant 100 of the present invention is equally applicable to driving a generator or similar device.

It is therefore intended by the appended claims to cover any and all such modifications, applications and embodiments within the scope of the present invention. Accordingly,

WHAT IS CLAIMED IS:

1. A liquid fuel power plant comprising:
   a central combustion chamber having an ignition region for receiving combustible liquid fuel and an oxidizer, and having means for igniting said fuel in said ignition region, the combustible fuel being ignited in said ignition region to produce hot pressurized gases in said combustion chamber;
   means for delivering said combustible liquid fuel to said ignition region;
   means for delivering said oxidizer to said ignition region;
   a tubular helical chamber having a first end and a second end, said tubular helical chamber being coupled at the first end to the combustion chamber to receive said hot pressurized gases from said combustion chamber, the central combustion chamber being disposed in the center of helix formed by the tubular helical chamber, said tubular helical chamber providing to a reaction region for further combustion of said hot pressurized gases received from said combustion chamber, said further combusted hot pressurized gases being exhausted at the second end of said tubular helical chamber.

2. A liquid fuel power plant as recited in claim 1 wherein said central combustion chamber is cylindrically shaped and said means for delivering said combustible fuel is located at the end of said central combustion chamber opposite the first end of said tubular helical chamber.

3. A liquid fuel power plant as recited in claim 2 further comprising heat shield means disposed for retaining in said central combustion chamber and said tubular helical chamber.

4. A liquid fuel power plant as recited in claim 1 wherein said central combustion chamber is cylindrically shaped and said means for delivering said oxidizer to said ignition region includes an opening in said central combustion chamber located at the end of said central combustion chamber opposite the first end of said tubular helical chamber.

5. A liquid fuel power plant as recited in claim 4 wherein
   a means for delivering said oxidizer to said ignition region includes a heat shield means being disposed away from said central combustion chamber and said tubular helical chamber to provide a passage way for heating pressurized air from an air inlet line.

6. A liquid fuel power plant as recited in claim 4 wherein said opening in the central combustion chamber has a curved lip for receiving said oxidizer.

7. A liquid fuel power plant as recited in claim 1 wherein said central combustion chamber is oval-shaped and said means for delivering said combustible fuel is located at the end of said oval-shaped central combustion chamber opposite the first end of said tubular helical chamber.

8. A liquid fuel power plant as recited in claim 7 wherein said central combustion chamber is oval shaped and said means for delivering said oxidizer to said ignition region includes an opening in said central combustion chamber located at the end of said central combustion chamber opposite the first end of said tubular helical chamber.

9. A liquid fuel power plant as recited in claim 8 wherein said opening in the central combustion chamber has a curved lip for receiving said oxidizer.

* * * * *